March 22, 1938.  S. W. FERRIS  2,111,968
HYDROCARBON OIL TREATMENT
Filed March 30, 1933
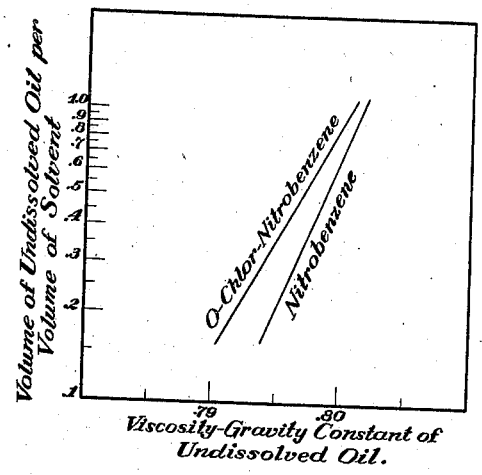
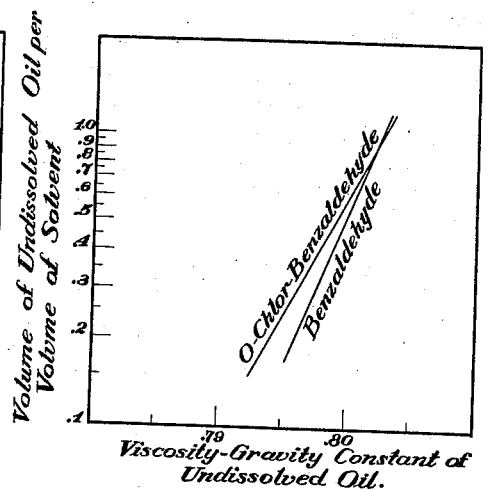
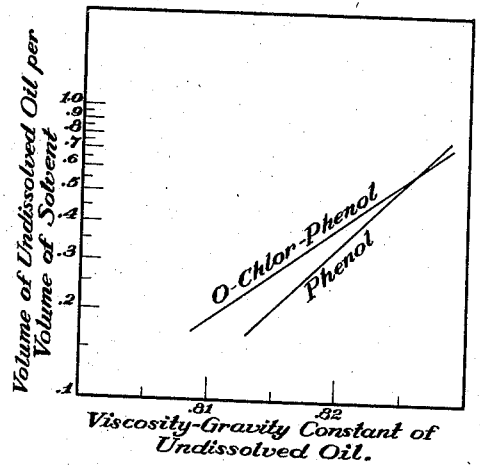
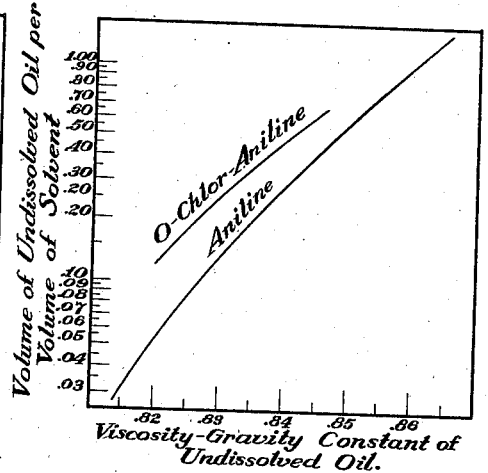
Inventor
Seymour W. Ferris
By T. Wallace Quinn
his Attorney Patented Mar. 22, 1938

2,111,968

UNITED STATES PATENT OFFICE 2,111,968

HYDROCARBON OIL TREATMENT

Seymour W. Ferris, Aldan, Pa., assignor to The Atlantic Refining Company, Philadelphia, Pa., a corporation of Pennsylvania Application March 30, 1933, Serial No. 663,586

31 Claims. (Cl. 196—13)

This invention relates to the art of hydrocarbon oil refining and has particular reference to the separation of hydrocarbon oils, especially crude petroleum or petroleum products, into fractions of different chemical composition while of approximately the same distillation range.

In accordance with my invention, hydrocarbon oils, particularly oils of substantial viscosity, are separated into various fractions by means of fractional extraction with a halogenated aromatic compound or a mixture of solvents containing substantial amounts of such a compound. By the term halogenated aromatic compound I mean to include one or a mixture of two or more polysubstituted benzenes containing as substituents at least one halogen and preferably at least one substituent other than halogen or alkyl, such as, for example, —OH, —NO$_2$, —NH$_2$, —CHO, —NHCH$_3$. Examples of this class of compounds are chlor-phenol, chlor-nitrobenzene and chlor-aniline.

It is recognized in the art that mineral oils, such as petroleum, comprises essentially a mixture of hydrocarbons of various groups or homologous series of compounds, such for example, as paraffins of the general formula C$_n$H$_{2n+2}$, olefins of the general formula C$_n$H$_{2n}$, hydroaromatics and polymethylenes of the same empirical formula, and various other series of compounds of chain and/or ring structures in which the hydrogen to carbon ratio is less than in the foregoing series. A large number of individual compounds of each series and of differing boiling points are present in petroleum.

The various types of crude petroleum, which are generally classified into three groups, namely, paraffinic base, naphthenic or asphaltic base, and mixed base, contain the various series of hydrocarbons mentioned heretofore in different proportions. For example, in the paraffin base crude oils, such as those obtained from the oil fields of Pennsylvania, there is a relatively large proportion of hydrocarbons having a chain structure and a high hydrogen to carbon ratio, whereas in the naphthenic or asphaltic base crude oils, there is a relatively large proportion of hydrocarbons having ring structures and a low hydrogen to carbon ratio. Mixed base crude oils, such as are obtained from the Mid-Continent oil fields, contain hydrocarbons in proportions intermediate these two extremes.

The variance in the proportion of the different series of hydrocarbons in paraffinic, naphthenic, and mixed base oils is evidenced by the physical properties of the various oils and particularly by the relationship of the specific gravity to the viscosity of one oil as compared with another. For example, an oil derived from a Pennsylvania crude and having a viscosity of 400 seconds Saybolt universal at 100° F., will show a specific gravity at 60° F. of about 0.878, whereas an oil of corresponding viscosity produced from a naphthenic crude, such as one from the Gulf Coast area, will show a specific gravity of about 0.933 at 60° F. The relationship between the viscosity and gravity indicates the degree of paraffinicity or naphthenicity of the oil, and such relationship may be expressed by the viscosity-gravity constant as hereinafter described.

If a given crude petroleum be distilled into successive fractions and the specific gravities and viscosities of the several viscous fractions be determined, it will be found that they conform to the general relationship expressed by the formulae—

$$G = \frac{1.0752 - a}{10} \log(V - 38)$$

or $G = 0.24 + 0.755a + 0.022 \log(V' - 35.5)$ in which "G" is the specific gravity at 60° F., "V" and "V'" are respectively Saybolt universal viscosities at 100° F. and 210° F., and "a" is a constant known as the viscosity-gravity constant. Viscous fractions from each of the different types of crude have different viscosity-gravity constants. While, in general, viscous fractions from a single crude have substantially the same viscosity-gravity constant, such constant is lower for fractions of the paraffinic crudes than is the constant for fractions of the naphthenic crudes. An article entitled "The viscosity-gravity constant of petroleum lubricating oils" by J. B. Hill and H. B. Coats, which will be found in vol. 20, page 641 et seq., Ind. and Eng. Chem. for June 1928, explains the determination of such constant for several typical oils.

The viscosity-gravity constant is, therefore, an index of the paraffinicity or naphthenicity of viscous oils, since when a given crude is distilled, the fractions thereof collected, and the specific gravity and the viscosity of each of the viscous fractions determined, such specific gravities and viscosities substituted in the formula, and the viscosity-gravity constants of the fractions calculated, it will be found that such constants are substantially the same.

The viscosity-gravity constants of the viscous fractions of some of the typical crudes are as follows:

| | |
|---|---|
| Milltown (Pennsylvania) | 0.8067 |
| Burbank (Mid-Continent) | 0.8367 |
| Guadalupe (Gulf Coast) | 0.8635 |
| Mirando (Gulf Coast) | 0.9025 |

While the above figures indicate the viscosity-gravity constants of specific oils from several types of crudes, it is to be understood that for any particular type of crude such constant may be within a range between values above and below the constant of the typical crude given. For example, viscous oils resulting from the distillation of Mid-Continent crudes have viscosity-gravity constants ranging from about 0.835 to about 0.855, whereas the viscous fractions resulting from distillation of Pennsylvania type crudes range from about 0.805 to 0.828, and in most instances, are below 0.820. Oils are increasingly paraffinic as their viscosity-gravity constants decrease.

My invention is based upon the discovery that oils containing both the paraffinic and the naphthenic series of hydrocarbons may be fractionally extracted with a halogenated aromatic compound and more particularly with a chloro-aromatic compound. The various series of hydrocarbons possess a differential solubility in such a solvent, the napthenic hydrocarbons being more soluble therein than the paraffinic hydrocarbons. By means of extraction with such solvent, it is therefore possible to effect a partial separation of the naphthenic hydrocarbons from the paraffinic, and to obtain from an oil containing both classes of hydrocarbons, an oil fraction which is more paraffinic than the original oil and one which is more naphthenic. By my invention, for example, it is possible to produce an oil of the quality normally obtained from Appalachian crudes, from crudes of the mixed base type from the Mid-Continent area, and conversely, to obtain oils from mixed base crudes such as are normally obtained from the naphthenic oils of the Gulf Coast area. In general, from oils from any source there may be obtained by my process, oils which are respectively more paraffinic and naphthenic than the oils normally obtained from such source by distillation.

In accordance with my invention I first mix the oil to be treated with a suitable proportion of the solvent at a temperature such that complete solution is effected and a homogeneous liquid obtained. I then cool the mixture to a temperature at which separation of the liquid into a two-layer system will take place. The upper layer will contain a relatively small amount of solvent dissolved in the paraffinic portion of the oil while the lower layer will contain the more naphthenic oil dissolved in the solvent. Or, I may agitate the mixture of solvent and oil at temperatures at which the liquids are only partially miscible, and thereby effect solution of the naphthenic portion of the oil in the solvent. In either of the above procedures I may take advantage of the principles of countercurrent extraction. After extraction, I effect separation of the two layers which form, by any suitable procedure, as for example, by decantation. I then remove from each of the separated layers, the portion of the solvent which each contains, by suitable procedure, such as by vacuum distillation, thereby to obtain two oils of similar distillation range but of different chemical composition and different physical properties. Before removing the solvent from the upper and more paraffinic layer, I may add a further quantity of solvent and repeat the extraction, thereby to remove additional naphthenic constituents from said layer.

My invention may be illustrated by the following specific example:

100 parts of an untreated distillate obtained from a Mid-Continent crude oil and having a viscosity of 154 seconds Saybolt universal at 210° F., a specific gravity at 60° F. of 0.9176, and a viscosity-gravity constant of 0.836 was mixed with 300 parts of o-chlor-phenol and heated to slightly above the temperature of complete miscibility, i. e., to approximately 27° C. The homogeneous liquid which resulted was cooled, with agitation, to 5° C. and allowed to settle, whereupon a two layer system formed which consisted of an upper undissolved oil layer comprising 86.4 parts of the mixture and a lower layer of oil dissolved in o-chlor-phenol comprising 313.6 parts of the mixture. After separation the layers were each freed of the solvent by vacuum distillation. The undissolved fraction yielded 20.5 parts of o-chlor-phenol and 65.9 parts of an oil having a viscosity of 128 seconds Saybolt universal at 210° F., a specific gravity of 0.8967 and a viscosity-gravity constant of 0.812. The dissolved fraction yielded 279.5 parts of o-chlor-phenol and 34.1 parts of oil having a viscosity of 191 seconds Saybolt universal at 210° F., a specific gravity of 0.9471 and a viscosity-gravity constant of 0.872.

From the above example it will be seen that by my process it is possible to obtain from a typical mixed base stock, two fractions, one having the characteristics of a Pennsylvania oil and the other the characteristics of a Gulf Coast oil.

Table I, given below, is a summary of extraction data comparing a group of substituted benzene solvents with their corresponding halogen derivatives, the chlor-compounds. The data in each case represents a single extraction with the solvent indicated therein. It will be observed that each non-halogenated solvent was employed in the production of two undissolved oil fractions of different viscosity-gravity constants, by using two different ratios of volume of solvent to volume of oil stock treated. Two extractions with the halogen derivative of each solvent were also made on the same oil stock as a basis for comparison of the halogenated and non-halogenated solvents.

tity of oil of a given viscosity-gravity constant with the employment of the least amount of sol- Table I

| Solvent | Sp. gr. solvent | Ratio vol. solvent to vol. of oil stock | Vis-grav. constant of oil stock | Vis-grav. constant of undissolved oil product | Vis-grav. constant of dissolved oil | Vol. of undissolved oil prod. per vol. of solvent employed |
|---|---|---|---|---|---|---|
| Phenol | 1.072 | 1 | 0.836 | 0.826 | 0.880 | 0.825 |
| O.-chlor-phenol | 1.241 | 1 | 0.836 | 0.825 | 0.885 | 0.825 |
| Phenol |  | 3 | 0.836 | 0.815 | 0.871 | 0.206 |
| O.-chlor-phenol |  | 3 | 0.836 | 0.812 | 0.872 | 0.220 |
| Aniline | 1.022 | 1 | 0.874 | 0.854 | 0.939 | 0.754 |
| O.-chlor-aniline | 1.213 | 1 | 0.874 | 0.842 | 0.909 | 0.518 |
| Aniline |  | 3 | 0.874 | 0.835 | 0.927 | 0.178 |
| O.-chlor-aniline |  | 3 | 0.874 | 0.823 | 0.924 | 0.153 |
| Benzaldehyde | 1.050 | 1 | 0.808 | 0.802 | 0.839 | 0.825 |
| O.-chlor-benzaldehyde |  | 1 | 0.808 | 0.802 | 0.839 | 0.825 |
| Benzaldehyde |  | 3 | 0.808 | 0.796 |  | 0.201 |
| O.-chlor-benzaldehyde |  | 3 | 0.808 | 0.794 | 0.832 | 0.192 |
| Nitrobenzene | 1.203 | 1 | 0.808 | 0.801 | 0.845 | 0.837 |
| O.-chlor-nitrobenzene | 1.368 | 1 | 0.808 | 0.800 | 0.854 | 0.840 |
| Nitrobenzene |  | 3 | 0.808 | 0.795 | 0.833 | 0.207 |
| O.-chlor-nitrobenzene |  | 3 | 0.808 | 0.792 | 0.838 | 0.208 |

The above table shows that halogenation increases the specific gravity of the aromatic solvents very substantially, which fact is important in that the specific gravity differential between solvent and oil is increased, thereby causing an increased rate of separation of the oil and solvent layers, which factor is of importance in the economic operation of the extraction process. It is desirable to have the specific gravity of the selective solvent as widely different from the specific gravity of the oil as possible, in order to bring about a rapid separation of the layers, particularly when a continuous process of extraction is employed. The halogen derivatives of substituted benzene hydrocarbons have, in general, a higher specific gravity than the corresponding non-halogenated solvents, and, as a class, are capable of producing, in a single extraction, a dissolved and an undissolved oil fraction having a greater viscosity-gravity constant differential than the non-halogenated solvents are capable of producing.

While the superiority of the halogenated solvents over the corresponding non-halogenated compounds is indicated by the above table, such superiority is more clearly shown by the graphs of the accompanying drawing, said drawing comprising four graphs each containing two curves drawn from data presented in Table I. In each graph, viscosity-gravity constant of undissolved oil is plotted as abscissa against the ratio, volume of undissolved oil per volume of solvent, as ordinate. One curve indicates the results obtained by a single batch extraction of the oil stock with a non-halogenated selective solvent and the other curve represents the results obtained by extraction with the corresponding halogenated solvent.

Since the primary object of the extraction process is the production of the greatest quantity of oil of a given viscosity-gravity constant with the employment of the least amount of solvent, it follows that the curve having the flattest slope and lying nearest the top of the graph indicates the most desirable selective solvent. The curve which lies farther to the left and above the other curve indicates a greater volume of undissolved oil of given viscosity-gravity constant per volume of solvent employed in the production thereof, than does the other curve, thereby showing the superiority of one solvent over the other. Or, from another point of view, for a constant ratio of volume of undissolved oil to volume of solvent, the first mentioned curve shows the undissolved oil to be of a lower viscosity-gravity constant than that indicated by the other curve. This comparison of selective solvents, as made in each graph of the accompanying drawing, is developed at length in an article entitled "Solvent extraction of lubricating oils" by Ferris et al., Ind. and Eng. Chemistry, vol. 23, page 753, July 1931. In line with the comparison made in this article, the graphs as herein presented, show, in general, the halogenated solvents to be superior to the corresponding non-halogenated solvents for the selective separation of a hydrocarbon oil into fractions respectively more paraffinic and more naphthenic.

Furthermore, I have found that the position of the halogen atom in the substituted aromatic compound, i. e., the ortho, meta or para position with regard to the substituent group, appears to be a factor of minor importance in the selective solvent action of the compound. Reference to Table II, given below, shows that neither the position nor the kind of halogen present in the aromatic compound exerts any marked influence upon selectivity.

Table II

| Solvent | Ratio vol. solvent to vol. of oil stock | Vis-grav. constant of oil stock | Percent undissolved oil | Vis-grav. constant of of undissolved oil | Percent dissolved oil | Vis-grav. constant of dissolved oil |
|---|---|---|---|---|---|---|
| O-chlor aniline | 3 | 0.836 | 62.0 | 0.810 | 38.0 | 0.875 |
| m-chlor-aniline | 3 | 0.836 | 61.5 | 0.811 | 38.5 | 0.871 |
| p-chlor-aniline | 3 | 0.836 | 60.0 | 0.810 | 40.0 | 0.870 |
| o-brom aniline | 3 | 0.836 | 63.3 | 0.810 | 36.7 | 0.880 |

From the foregoing data it will be seen that by extraction of a mineral oil with a halogenated aromatic compound there may be obtained oil fractions which are respectively more paraffinic and more naphthenic than the original oil. By repetition of the extraction process or by a continuous countercurrent process, the undissolved oil fraction may be rendered increasingly paraffinic, as evidenced by a progressively decreasing viscosity-gravity constant.

In extracting oils containing appreciable quantities of wax, such oils may be dewaxed, for example, by cold settling or centrifuging prior to carrying out the extraction. My process is operable, however, in the absence of preliminary dewaxing.

For brevity, in the appended claims the term "liquid polysubstituted benzene containing as nuclear substituents at least one halogen from the group consisting of chlorine and bromine and at least one substituent other than halogen and alkyl" is employed in a generic sense to include one or a mixture of two or more polysubstituted benzenes in which nuclear hydrogen atoms are replaced by at least one atom of a halogen from the group consisting of chlorine and bromine and at least one substituent other than halogen and alkyl, said compounds having melting points of less than substantially 200° C., and being liquid at the temperature and under the operating conditions of the extraction operation; or a mixture of solvents containing substantial amounts of said polysubstituted benzenes. The term "viscous oil" is to be understood as comprehending an oil of substantial viscosity, i. e., of the order of 50 seconds Saybolt universal at 100° F., or more.

What I claim is:

1. In the art of refining mineral oils, the process which comprises separating an oil containing paraffinic and naphthenic hydrocarbons into fractions respectively richer in paraffinic and naphthenic compounds by extracting said oil with a liquid polysubstituted benzene containing as nuclear substituents at least one halogen from the group consisting of chlorine and bromine and at least one substituent other than halogen and alkyl.

2. In the art of refining mineral oils, the process which comprises adding a liquid polysubstituted benzene containing as nuclear substituents at least one halogen from the group consisting of chlorine and bromine and at least one substituent other than halogen and alkyl to an oil containing paraffinic and naphthenic hydrocarbons, heating the mixture to such temperature as to effect solution, cooling the solution to form a two-layer system, and separating the upper layer from the lower layer.

3. In the art of refining mineral oils, the process which comprises adding a liquid polysubstituted benzene containing as nuclear substituents at least one halogen from the group consisting of chlorine and bromine and at least one substituent other than halogen and alkyl to an oil containing paraffinic and naphthenic hydrocarbons, heating the mixture to such temperature as to effect solution, cooling the solution to form a two layer system, removing the lower layer, and similarly retreating the upper layer with a liquid polysubstituted benzene containing as nuclear substituents at least one halogen from the group consisting of chlorine and bromine and at least one substituent other than halogen and alkyl.

4. In the art of refining mineral oils, the process which comprises bringing a mineral oil containing paraffinic and naphthenic hydrocarbons into contact with a liquid polysubstituted benzene containing as nuclear substituents at least one halogen from the group consisting of chlorine and bromine and at least one substituent other than halogen and alkyl thereby to effect solution of a portion richer in naphthenic hydrocarbons in the polysubstituted benzene, separating the solution so formed from the remainder of the oil, and removing the solvent from both portions of the oil, thereby to obtain fractions of the oil respectively richer in paraffinic and naphthenic hydrocarbons.

5. The process of treating a viscous fraction of a crude oil of one type containing paraffinic and naphthenic hydrocarbons to procure a fraction having the quality of a corresponding fraction of a crude oil of different type having a greater content of paraffinic hydrocarbons, which comprises extracting the viscous fraction with a liquid polysubstituted benzene containing as nuclear substituents at least one halogen from the group consisting of chlorine and bromine and at least one substituent other than halogen and alkyl, and separating the oil so treated into portions respectively richer in paraffinic and naphthenic hydrocarbons.

6. In the art of refining mineral oils, the process which comprises bringing a liquid polysubstituted benzene containing as nuclear substituents at least one halogen from the group consisting of chlorine and bromine and at least one substituent other than halogen and alkyl into intimate contact with a viscous hydrocarbon oil of a quality other than that of a Pennsylvania type viscous oil, and containing paraffinic and naphthenic components, thereby to dissolve from the oil substantial amounts of its naphthenic components, thereafter removing the solvent and oil dissolved therein from that portion of the oil which remains undissolved, thereby to produce an oil such as is normally obtained from Pennsylvania type crude by distillation.

7. In the art of refining mineral oils, the process which comprises bringing a mineral oil containing paraffinic and naphthenic hydrocarbons into contact with a liquid polysubstituted benzene containing as nuclear substituents at least one halogen from the group consisting of chlorine and bromine and at least one substituent other than halogen and alkyl thereby to effect solution of a portion richer in napthenic hydrocarbons in the solvent, separating the solution so formed from the remainder of the oil, and retreating the oil remaining with additional amounts of a liquid polysubstituted benzene containing as nuclear substituents at least one halogen from the group consisting of chlorine and bromine and at least one substituent other than halogen and alkyl.

8. The process for separating mineral oils containing paraffinic and naphthenic hydrocarbons into fractions which comprises bringing the oil into contact with a liquid polysubstituted benzene containing as nuclear substituents at least one halogen from the group consisting of chlorine and bromine and at least one substituent other than halogen or alkyl, thereby to effect solution of a portion of the oil richer in naphthenic hydrocarbons in the said polysubstituted benzene, separating the solution so formed from the remainder of the oil, and distilling the solvent from both of the portions of the oil, thereby to obtain fractions of the oil respectively richer in paraffinic and naphthenic hydrocarbons.

9. The method of producing paraffinic lubricating oil from mixed base crude which comprises distilling the crude and bringing a portion thereof into contact with a liquid polysubstituted benzene containing as nuclear substituents at least one halogen from the group consisting of chlorine and bromine and at least one substituent other than halogen or alkyl, thereby partially dissolving the oil, separating the said polysubstituted benzene solution of oil so treated, and removing the polysubstituted benzene from the treated oil.

10. In the art of refining mineral lubricating oil containing paraffinic and naphthenic hydrocarbons, the step of fractionally extracting the oil with a liquid polysubstituted benzene containing as nuclear substituents at least one halogen from the group consisting of chlorine and bromine and at least one substituent other than halogen or alkyl, to effect a separation of fractions respectively richer in paraffinic and naphthenic compounds.

11. The process of treating a viscous fraction of a crude oil of one type containing paraffinic and naphthenic hydrocarbons to procure a fraction having the quality of a corresponding fraction of a crude oil of different type having a greater content of paraffinic hydrocarbons, which comprises extracting the viscous fraction with a liquid polysubstituted benzene containing as nuclear substituents at least one halogen from the group consisting of chlorine and bromine and at least one substituent other than halogen or alkyl, and separating the oil so treated into portions respectively richer in paraffinic and naphthenic hydrocarbons.

12. The process of treating a viscous fraction of a mixed base crude oil to procure a fraction having the quality of a corresponding fraction of a paraffinic base crude, which comprises extracting the viscous fraction with a liquid polysubstituted benzene containing as nuclear substituents at least one halogen from the group consisting of chlorine and bromine and at least one substituent other than halogen or alkyl, and separating the oil so treated into portions respectively richer in paraffinic and naphthenic compounds.

13. In the art of refining mineral oils, the process which comprises bringing a mineral oil containing paraffinic and naphthenic hydrocarbons into contact with a liquid polysubstituted benzene containing as nuclear substituents at least one chlorine atom and at least one of the group comprising the hydroxyl, nitro, aldehyde, amino and substituted amino groups, thereby to effect solution of a portion richer in naphthenic hydrocarbons in the solvent, separating the solution so formed from the remainder of the oil, and removing the solvent from both portions of the oil, thereby to obtain fractions of the oil respectively richer in paraffinic and naphthenic hydrocarbons.

14. In the art of refining mineral oils, the process which comprises adding a liquid polysubstituted benzene containing as nuclear substituents at least one chlorine atom and at least one of the group comprising the hydroxyl, nitro, aldehyde, amino and substituted amino groups, to a viscous oil liquid at ordinary temperatures containing paraffinic and naphthenic hydrocarbons, heating the mixture to a temperature sufficient to effect solution, cooling the solution to a temperature sufficient to form two layers respectively richer in naphthenic hydrocarbons and paraffinic hydrocarbons other than wax, and separating the upper layer richer in paraffinic hydrocarbons from the lower layer richer in naphthenic hydrocarbons.

15. In the art of refining mineral oils, the process which comprises bringing a liquid polysubstituted benzene containing as nuclear substituents at least one chlorine atom and at least one of the group comprising the hydroxyl, nitro, aldehyde, amino and substituted amino groups, into intimate contact with a viscous hydrocarbon oil of a quality other than that of a Pennsylvania type viscous oil, and containing paraffinic and naphthenic components, thereby to dissolve from the oil substantial amounts of its naphthenic components, thereafter removing the solvent and oil dissolved therein from that portion of the oil which remains undissolved, thereby to produce an oil such as is normally obtained from Pennsylvania type crude by distillation.

16. The process of decreasing the viscosity-gravity constant of a viscous mineral oil which comprises extracting the oil with a liquid polysubstituted benzene containing as nuclear substituents at least one halogen from the group consisting of chlorine and bromine and at least one substituent other than halogen and alkyl.

17. The process of decreasing the viscosity-gravity constant of a viscous mineral oil at least 0.015 which comprises extracting the oil with a liquid polysubstituted benzene containing as nuclear substituents at least one chlorine atom and at least one of the group comprising the hydroxyl, nitro, aldehyde, amino and substituted amino groups.

18. The process of treating a viscous mineral oil of viscosity-gravity constant between substantially 0.808 and 0.875 to reduce the viscosity-gravity constant by at least 0.015, which comprises fractionally extracting said viscous oil with a liquid polysubstituted benzene containing as nuclear substituents at least one halogen and at least one of the group comprising the hydroxyl, nitro, aldehyde, amino and substituted amino groups.

19. The process of treating a viscous mineral oil of viscosity-gravity constant between substantially 0.808 and 0.836 to reduce the viscosity-gravity constant by at least 0.015, which comprises fractionally extracting said viscous oil with a liquid polysubstituted benzene containing as nuclear substituents at least one halogen and at least one of the group comprising the hydroxyl, nitro, aldehyde, amino and substituted amino groups.

20. The process of treating a viscous mineral oil of viscosity-gravity constant higher than 0.835 to produce an oil having a viscosity-gravity constant of less than 0.828 which comprises fractionally extracting said viscous oil with a liquid polysubstituted benzene containing as nuclear substituents at least one halogen and at least one of the group comprising the hydroxyl, nitro, aldehyde, amino and substituted amino groups.

21. In the art of refining mineral oils, the process which comprises separating an oil containing paraffinic and naphthenic hydrocarbons into fractions respectively richer in paraffinic and naphthenic compounds by extracting said oil with a polysubstituted benzene containing as nuclear substituents chlorine and an amino group.

22. In the art of refining mineral oils, the process which comprises separating an oil containing paraffinic and naphthenic hydrocarbons into fractions respectively richer in paraffinic and naphthenic compounds by extracting said oil with a polysubstituted benzene containing as nuclear substituents chlorine and a hydroxyl group.

23. In the art of refining mineral oils, the process which comprises separating an oil containing paraffinic and naphthenic hydrocarbons into fractions respectively richer in paraffinic and naphthenic compounds by extracting said oil with a polysubstituted benzene containing as nuclear substituents chlorine and a nitro group.

24. A process for separating mineral oil containing paraffinic and non-paraffinic fractions into more paraffinic and less paraffinic fractions which comprises commingling said oil with chloraniline to cause phase separation and separating the chloraniline and dissolved fractions from the remaining undissolved more paraffinic fractions.

25. A process for separating oil into fractions which comprises commingling said oil with chloraniline to cause separation of raffinate and extract phases, separating the extract phase containing chloraniline and oil fractions dissolved therein from the raffinate phase containing the undissolved fractions, and separating the chloraniline from said fractions.

26. A process for the separation of oil into fractions which comprises commingling said oil with chloraniline below the temperature of complete miscibility to cause separation of extract and raffinate phases, and separating the extract phase containing chloraniline and oil fractions dissolved therein from the raffinate phase containing the undissolved fractions.

27. In a process of treating liquid hydrocarbon mixtures containing both saturated and unsaturated constituents, the steps of extracting the oil with a solvent comprising monochlorophenol as a selective solvent to form a raffinate phase and an extract phase, and separating said phases.

28. A process for separating mineral oil containing paraffinic and non-paraffinic fractions into more paraffinic and less paraffinic fractions which comprises commingling said oil with chloro nitrobenzene to cause phase separation and separating the chloro nitrobenzene and dissolved fractions from the remaining undissolved more paraffinic fractions.

29. A process for separating oil into fractions which comprises commingling said oil with chloro nitrobenzene to cause separation of raffinate and extract phases, separating the extract phase containing chloro nitrobenzene and oil fractions dissolved therein from the raffinate phase containing the undissolved fractions, and separating the chloro nitrobenzene from said fractions.

30. A process for the separation of oil into fractions which comprises commingling said oil with chloro nitrobenzene below the temperature of complete miscibility to cause separation of extract and raffinate phases, and separating the extract phase containing chloro nitrobenzene and oil fractions dissolved therein from the raffinate phase containing the undissolved fractions.

31. In a process of treating liquid hydrocarbon mixtures containing both saturated and unsaturated constituents, the steps of extracting the oil with a solvent comprising chloro nitrobenzene as a selective solvent to form a raffinate phase and an extract phase, and separating said phases.

SEYMOUR W. FERRIS.